United States Patent [19]

O'Connor et al.

[11] Patent Number: 4,521,546

[45] Date of Patent: Jun. 4, 1985

[54] GRAFT COPOLYMERS FROM VINYL MONOMERS AND POLYURETHANE OLIGOMERS AND POLYURETHANES PREPARED THEREFROM

[75] Inventors: James M. O'Connor, Clinton; Donald L. Lickei, Wallingford, both of Conn.

[73] Assignee: Olin Corporation, Cheshire, Conn.

[21] Appl. No.: 511,371

[22] Filed: Jul. 6, 1983

Related U.S. Application Data

[63] Continuation of Ser. No. 333,209, Dec. 21, 1981, abandoned.

[51] Int. Cl.[3] .................. C12P 7/58; C12P 13/02; C08F 283/04
[52] U.S. Cl. .................. 521/137; 521/128; 521/129; 525/455
[58] Field of Search .............. 525/455; 521/137

[56] References Cited

U.S. PATENT DOCUMENTS 4,034,017  7/1977  Chang et al. .................. 525/440

*Primary Examiner*—John C. Bleutge
*Assistant Examiner*—A. L. Carrillo
*Attorney, Agent, or Firm*—William D. Sabo

[57] ABSTRACT

Graft copolymers are prepared by the copolymerization of an ethylenically unsaturated monomer, or a mixture of such monomers, with a polyurethane oligomer in a polyol. The polyurethane oligomer is the reaction product of an isocyanate-terminated prepolymer with an isocyanate reactive group-containing unsaturated monomer. The graft copolymers are useful in polyurethane formulations.

26 Claims, No Drawings

GRAFT COPOLYMERS FROM VINYL MONOMERS AND POLYURETHANE OLIGOMERS AND POLYURETHANES PREPARED THEREFROM

This is a continuation of application Ser. No. 333,209, filed Dec. 21, 1981, now abandoned.

This invention relates to graft copolymers of ethylenically unsaturated monomers and polyurethane oligomers. The invention further relates to the use of these graft copolymers in polyurethane formulations.

A great deal of art has arisen focusing on methods for increasing the overall molecular weight of polyols without seriously affecting backbone chain length and attendant fluidity by incorporating polymeric materials onto the polyol by grafting. Such graft copolymer polyol dispersions have proven to be advantageous when used in polyurethane formulations to achieve desirable polyurethane product properties.

It is known in the art to prepare graft copolymer dispersions from vinyl monomers and polyols and to use these copolymers in the formulation of urethane polymers. See, for example, U.S. Pat. No. 3,383,351. According to U.S. Pat. No. 3,966,521, graft copolymers can also be formed by reacting vinyl monomers in polyols containing some degree of unsaturation. Other patents which show the state of the art are: U.S. Pat. Nos. 3,823,201; 3,968,089; 4,049,590; 4,104,236; 4,125,505; and 4,119,586.

None of these patents, however, shows graft copolymers which are prepared from vinyl monomers and polyurethane oligomers.

Now, an improved graft copolymer has been developed which can be prepared by copolymerizing in the presence of a free radical catalyst an ethylenically unsaturated monomer, or a mixture of such monomers, with a polyurethane oligomer in a polyol. It has been found that the graft copolymer products have excellent stability, and that they have utility in preparing a wide variety of polyurethane products. They can be used, for example, to produce flexible foams having improved load bearing characteristics, and also can be utilized in making elastomers which demonstrate enhanced flexural modulus properties.

The polyurethane oligomer that is utilized according to the invention is prepared by first reacting an organic polyisocyanate with a polyol in an equivalent ratio of NCO/OH from about 1.02/1 to about 2/1, using standard procedures, to yield an isocyanate-terminated prepolymer of controlled molecular weight. Preferably, the NCO/OH ratio ranges from about 1.1/1 to about 1.4/1. Preferably, the reaction is accelerated by employing a catalyst; common urethane catalysts, e.g., tertiary amines and metal compounds such as stannous octoate or dibutyltin dilaurate may be used. Any catalytic amount may be employed; illustratively, such amount varies, depending on the particular catalyst utilized, from about 0.01 to about 1 percent by weight of the polyurethane oligomer. It is also preferred to carry out the reaction in the presence of a reactive copolymerizable solvent. Suitable copolymerizable solvents include vinylidene compounds such as styrene, vinyl toluene, methacrylic esters, acrylic esters, divinyl benzene, and the like, familiar to those skilled in the art. The amount of copolymerizable solvent employed may be varied over a wide range. Generally, however, the copolymerizable solvent is employed in an amount of from about 0 to about 200 parts by weight per 100 parts by weight of the polyurethane oligomer.

The polyol reactant used in the prepolymer formation is selected from polyether polyols and polyester polyols and mixtures of two or more such compounds. The polyol, or mixture of polyols, should have an average equivalent weight ranging from about 100 to about 6,000. Preferably, the average equivalent weight is about 1,000 to about 3,000. The average functionality of the polyol or polyol blend is usually about 2 to about 6, and preferably about 2 to about 3.

Suitable polyester polyols include the products of reacting polycarboxylic acids with polyhydric alcohols. Illustrative polycarboxylic acids include, for example, oxalic, malonic, succinic, glutaric, adipic, pimelic, suberic, azelaic, phthalic and isophthalic acids, and the like. Illustrative polyhydric alcohols include various diols, triols, tetrols and higher functionality alcohols, such as ethylene glycol, 1,3-propylene glycol, 1,2-propylene glycol, butylene glycols, butane diols, pentane diols, glycerol, trimethylolpropane, trimethylolhexane, hexane 1,2,6-triol, pentaerythritol, sorbitol, 2-methyl glucoside, mixtures thereof, and the like.

Polyether polyols are the preferred polyol reactant. Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether polyol reactant includes the following and mixtures thereof: (a) the aliphatic diols such as ethylene glycol, 1,3-propylene glycol, 1,2-propylene glycol, butylene glycols, butane diols, pentane diols, and the like; (b) the aliphatic triols such as glycerol, trimethylolpropane, triethylolpropane, trimethylolhexane, and the like; (c) higher functionality alcohols such as sorbitol, pentaerythritol, methyl glucoside, and the like; (d) the polyamines such as tetraethylene diamine; and (e) the alkanolamines such as diethanolamine, triethanolamine and the like.

A preferred group of polyhydric initiators for use in preparing the polyether polyol reactant is one which comprises aliphatic diols and triols such as ethylene glycol, propylene glycol, glycerol, trimethylolpropane and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 100 to about 6,000, preferably about 1,000 to about 3,000, and more preferably about 2,000. The catalyst is thereafter preferably removed, leaving a polyether polyol which is ready for use in preparing the isocyanate-terminated prepolymer for use according to the invention.

Any suitable organic polyisocyanate, or mixture of polyisocyanates, may be used in the polyurethane prepolymer formation. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate, xylene diisocyanate, 3,3'-bitoluene-4,4'-diisocyanate, hexamethylene diisocyanate, naphthalene-1,5-diisocyanate, the polymeric isocyanates such as polyphenylene polymethylene isocyanate, mixtures thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20. The amount of polyisocyanate employed in the prepolymer formation should be sufficient to provide at least about 1.02 to about 2 NCO groups per hydroxy group in the reaction system. Preferably, polyisocyanate is used in a proportion to provide about 1.1 to about 1.4 NCO groups per each hydroxy group.

In forming the prepolymer, other ingredients, such as chain extenders, well known to those in the polyurethane art, also may be included in the reaction mixture. These chain extenders include low molecular weight glycols such as ethylene glycol, butane diol, hexane diol, propylene glycol, bisphenol A, and the like.

To form the polyurethane oligomer that is utilized according to the invention, the prepared isocyanate-terminated prepolymer, as defined above, is then reacted with an isocyanate reactive group-containing unsaturated monomer. The reaction is carried out using methods well known in the art and employing such relative proportions of the reactants so as to achieve an oligomer product having a final free NCO content preferably of from about 0 to about 1 percent, and most preferably from about 0 to about 0.5 percent. Suitable isocyanate reactive group-containing unsaturated monomers include acrylates, methacrylates and acrylamides such as hydroxyethyl acrylate, hydroxypropyl acrylate, hydroxyethyl methacrylate, hydroxyethyl acrylamide, hydroxypropyl acrylamide, and the like, and mixtures thereof. Acrylates and methacrylates are preferred, with hydroxyethyl acrylate, hydroxypropyl acrylate, and hydroxyethyl methacrylate being the most preferred. By reaction of the isocyanate-terminated prepolymer with the isocyanate reactive group-containing unsaturated monomer, a controlled molecular weight polyurethane oligomer with terminal reactive unsaturation is produced.

To form the graft copolymers of the present invention, the polyurethane oligomers are copolymerized with an ethylenically unsaturated monomer, or a mixture of such monomers, in a polyol. The polyol is selected from the polyester polyols and the polyether polyols as defined above. Preferably, the polyol, or mixture of polyols, has an average equivalent weight in the range from about 100 to about 6,000, and more preferably 1,000–3,000, and an average functionality of about 2 to about 3. In a particularly preferred embodiment, the polyol used in the copolymerization reaction is the same as that employed in preparing the polyurethane oligomer.

The monomers useful in the copolymerization process are any polymerizable monomers characterized by the presence of at least one ethylenic unsaturated group of the type $>C=C<$. Representative ethylenically unsaturated monomers which may be employed in the practice of the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, and the like, such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl-2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis (β-chloroethyl) vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumerate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Preferred monomers include styrene, acrylonitrile, vinyl chloride, methyl methacrylate, hydroxyethyl acrylate, butadiene, isoprene, chloroprene, and the like. Styrene and acrylonitrile are particularly preferred.

In accordance with the invention, the graft copolymers can also be formed by employing a mixture of an ethylenically unsaturated monomer as described above and a polyfunctional monomer. Suitable polyfunctional monomers include diacrylates, dimethacrylates, diacrylamides, and the like. Illustrative polyfunctional monomers are, for example, hexamethylene diacrylate, ethylene dimethacrylate, divinyl benzene, and the like.

The overall grafting reaction proceeds in a manner as is known in the art, using conventional reaction conditions and in the presence of a catalytically effective amount of a free radical catalyst. In carrying out the free radical grafting copolymerization, any suitable free radical initiator may be used. Illustrative catalysts are the well-known free radical type of vinyl polymerization catalysts, for example, the peroxides, persulfates, perborates, percarbonates, azo compounds, and the like, including hydrogen peroxide, dibenzoyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis (p-methoxybenzoyl) peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, α-methylbenzyl hydroperoxide, α-methyl-α-ethyl benzyl hydroperoxide, Tetraline hydroperoxide, triphenylmethyl hydroperoxide, diphenylmethyl hydroperoxide, α,α-azo-2-methyl butyronitrile, α,α-2-methyl heptonitrile, 1,1'-azo-1-cyclohexane carbonitrile, dimethyl α,α'-azo-isobutyrate, 4,4'-azo-4-cyanopentanoic acid, azo-bis (isobutyronitrile), persuccinic acid, diisopropyl peroxy dicarbonate, and the like; a mixture of catalysts may also be used. Azo-bis (isobutyronitrile) is the preferred catalyst.

An advantageous graft copolymerization reaction scheme is to add ethylenically unsaturated monomer, polyurethane oligomer and free radical catalyst separately or combined to a heated reactor containing unreacted polyol in order to produce a graft copolymer of monomer and oligomer dispersed in a polyol medium. Reaction temperatures normally range between about 80° to about 170° C., and preferably from about 90° to about 140° C. Any unreacted ethylenically unsaturated monomer can be readily stripped from the product by conventional means.

The amounts of the respective reactants in the graft copolymerization reaction determine the extent of copolymerized product present in the final graft copolymer dispersion. By varying the reactant proportions, a range of graft copolymerized products can be formed, which, in turn, can be utilized in formulations to produce various polyurethane properties.

The polyurethane oligomer is generally employed in an amount which constitutes from about 0.2 to about 15 percent based on the weight of total polyol utilized in carrying out the copolymerization reaction. Using from about 0.5 to about 5 percent, based on the weight of total polyol, has been found to be most preferred.

The amount of ethylenically unsaturated monomer used in the copolymerization reaction preferably ranges from about 5 to about 60 percent, and most preferably from about 15 to about 40 percent, based on the weight of total polyol.

The concentration of the free radical catalyst can vary from about 0.1 to about 10 percent, and preferably from about 1 to about 3 percent, based on the weight of the ethylenically unsaturated monomer.

The graft copolymer dispersions of the present invention are particularly suited for use in polyurethane formulations, as shown in Examples 16-23 below. The presence of the multiple terminal hydroxyl groups allows the polyurethane forming reaction with organic polyisocyanates. Modification of the amount of terminal hydroxyl causes variation of resulting polyurethane products. The amount of branching and cross-linking is directly dependent on the number of hydroxyl groups in the original resin. Properties can be varied to form polyurethane products such as elastic fibers, elastomers, or flexible, semi-rigid, or rigid foams.

The polyurethane products are prepared by reacting any suitable combination of a graft copolymer of the invention, an organic polyisocyanate, and optionally an additional polyol, in the presence of a catalyst for the reaction. When the polyurethane to be produced is a foam, the reaction mixture further includes a foaming agent and usually a foam stabilizing agent. In the preparation of the polyurethane compositions, either of the general polyurethane forming processes, the "one-shot" or the "prepolymer" processes, may be utilized.

The organic polyisocyanate reactant used in preparing the polyurethane products of this invention may be any of those described above as being useful in forming the isocyanate-terminated prepolymer component employed in preparing the polyurethane oligomers. In practice, the organic polyisocyanate is usually used in a proportion to provide no more than about 1.25 NCO groups per each hydroxy group. A 100 multiple of the ratio of NCO to OH groups in the reaction system is referred to as the "index".

The catalyst employed in preparing the polyurethane compositions of the invention may be any of the catalysts known to be useful for this purpose. Depending upon the type of product desired, the catalyst may include, for example, a tertiary amine, an organo-metallic salt, a mixture of an organo-metallic salt with one or more tertiary amine, and the like. Typical tertiary amines include for example triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, a mixture of dimethylcyclohexylamine and 2-(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV" and "Dabco 8020", respectively, bis(dimethylaminopropylether), and mixtures of these catalysts. The preferred tertiary amine catalysts are triethylene diamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1–1.5, and preferably about 0.25–0.75, parts per 100 parts by weight of the total polyol which is employed in preparing the polyurethane.

Typical organo-metallic salts include for example the salts of tin, mercury, titanium, antimony, aluminum, cobalt, zinc, bismuth, lead, and cadmium, the tin salts, i.e., stannic and stannous salts, being preferred. Illustratively such salts include the octoates, dilaurates, diacetate, dioctoates, oleates, and neodeconates of these metals, the octoates being preferred. The organo-metallic salt catalyst is used in a proportion of about 0–0.5, and preferably about 0.05–0.2, parts per 100 parts by weight of total polyol which is employed in preparing the polyurethane.

When the product being formed is a polyurethane foam, this may be accomplished by employing a small amount of a conventional polyurethane foaming agent. Any suitable foaming agent, or mixture of foaming agents, may be employed. These include inorganic foaming agents, such as water, and organic foaming agents containing up to seven carbon atoms, such as the halogenated hydrocarbons, and the low molecular weight alkanes, alkenes, and ethers. Illustrative organic agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether, diisopropyl ether, mixtures thereof, and the like. Water and the low molecular weight polyhalogenated alkanes, such as monofluorotrichloromethane, dichlorodifluoromethane and methylene chloride, are preferred. The amount of foaming agent can be varied over a wide range, as is known to those skilled in the art.

It is preferred in the preparation of the polyurethane foams of the invention to employ minor amounts of a conventional surfactant in order to further improve the cell structure of the polyurethane foam. Suitable such surfactants include, for example, the silicon-based surfactants such as the silicones and the siloxane-oxyalkylene block copolymers, all of which are commercially available materials. Generally, the silicones are employed in a proportion of up to about 0.1 parts per 100 parts by weight of total polyol; and the siloxane-oxyalkylene block copolymers are employed in a proportion of up to about 2 parts per 100 parts by weight of total polyol.

The polyurethane formulations may also include various other additives and ingredients known to those skilled in the art.

The following examples are provided to further illustrate the invention. All parts and percentages are by weight unless otherwise specified.

Preparation of Polyurethane Oligomers

EXAMPLE 1

977 Grams (0.5 eq.) of a polyether polyol[1] were heated to 100° C. and degassed at 0.2 torr pressure for a period of one hour. After cooling to 60° C., 52.2 grams (0.6 eq.) of diisocyanate[2] were added to the polyol in one portion. The reaction mixture was stirred at 80° C. for one hour and allowed to cool to 70° C. At this time, 0.2 ml of a catalyst[3] was added. The reaction temperature rose to 80° C., and a large increase in viscosity was noted within several minutes. After heating at 80° C. for an additional hour, 11.6 grams (0.1 eq.) of hydroxyethyl acrylate were added. The reaction mixture was stirred at 80° C. for one hour and then held at 80° C. in an oven overnight. The resulting material had a viscosity of 276,000 cps at 30° C.

[1]This is a polyol having a molecular weight of about 4,000 and prepared by end-capping a propoxylated propylene glycol precursor with ethylene oxide to a final hydroxyl number of about 28.7.
[2]This is a mixture of toluene diisocyanate isomers (80:20 mixture of 2,4/2,6-isomers).
[3]This is stannous octoate and is a commercial product of Witco Chemical Corporation purchased under the designation "C-2."

EXAMPLE 2

391 Grams (0.2 eq.) of a polyether polyol[1] and 178 grams of styrene solvent (30% by weight of final mixture) were mixed together. 0.2 Ml of a catalyst[2] were added to the mixture followed by 21 grams (0.24 eq.) of diisocyanate[3] added in one portion at ambient temperature. After several minutes, the exotherm had reached 35°–37° C. and external heat was applied. The reaction mixture was stirred at 70° C. for one hour. 4.64 Grams (0.04 eq.) of hydroxyethyl acrylate were added and the reaction mixture was stirred for one additional hour at 70° C. The polyurethane oligomer solution in styrene had a viscosity of 16,000–20,000 cps at 25° C.

[1]This is a polyol having a molecular weight of about 4,000 and prepared by end-capping a propoxylated propylene glycol precursor with ethylene oxide to a final hydroxyl number of about 28.7.
[2]This is a stannous octoate and is a commercial product of Witco Chemical Corporation purchased under the designation "C-2".
[3]This is a mixture of toluene diisocyanate isomers (80:20 mixture of 2,4/2,6-isomers).

Preparation of Graft Copolymers

EXAMPLE 3

367 Grams of a polyether polyol[1] were weighed into a one-liter, 3-neck round bottom flask, equipped with stirrer and nitrogen inlet and outlet, and were heated to 100° C. and then purged with $N_2$ (via an inlet tube below the surface of the polyol) for 30 minutes. $N_2$ addition was continued during the course of the reaction. Next a mixture of 100 grams of the polyurethane oligomer of Example 1, 100 grams of styrene and 3.0 grams of azo-bis-isobutyronitrile (AIBN) dissolved in 14 grams of methylene chloride was fed into the polyol over a 6 hour period maintaining the reaction mixture temperature at 100° C. during the addition. The reaction mixture was cooled overnight, and then reheated to 75°–100° C. at which temperature the methylene chloride and excess styrene were stripped from the fluid white suspension. The yield of graft copolymer was 476 grams or about 84% conversion of styrene. The viscosity of the graft copolymer product was found to be 8,700 cps at 25° C.

[1]This is a polyol having a molecular weight of about 4,000 and prepared by end-capping a propoxylated propylene glycol precursor with ethylene oxide to a final hydroxyl number of about 28.7.

EXAMPLE 4

375 Grams of a polyether polyol[1] were weighed into a one-liter, 3-neck round bottom flask, equipped with stirrer and nitrogen inlet and outlet, and were heated to 100° C. and then purged with $N_2$ (via an inlet tube below the surface of the polyol). $N_2$ was introduced continuously during the entire course of the reaction. After purging with $N_2$ at 100° C. for 30 minutes, a mixture of 35.7 grams of the polyurethane oligomer of Example 2, 89.3 grams of styrene and 3.0 grams of AIBN dissolved in 15 grams of methylene chloride was added by a transfer pump at a rate of about 0.8 grams per minute. All the material was added within about 2½ hours and the mixture was stirred at 100° C. for 1 additional hour after completion of the addition. The mixture was placed under vacuum at 100° C. and the pressure gradually decreased to 2 mm Hg where it was held for about 1½ hours. The mixture was allowed to cool to room temperature. The homogeneous white liquid product weighed a total of 478 grams (theoretical is 500–502.5 grams). The styrene conversion was 75.5–78%. The viscosity was measured on a Brookfield viscometer to be 5,600 cps at 23° C. Gel Permeation Chromatography (GPC) showed peak molecular weights at 4,600 (75%) and 24,000 (25%).

[1]This is a polyol having a molecular weight of about 4,000 and prepared by end-capping a propoxylated propylene glycol precursor with ethylene oxide to a final hydroxyl number of about 28.7.

EXAMPLE 5

375 Grams of a polyether polyol[1] were weighed into a one-liter, 3-neck round bottom flask equipped with thermometer, stirrer and nitrogen inlet and outlet, and were heated to 100° C. $N_2$ gas was then passed through the polyol via a subsurface inlet tube. The $N_2$ purge was continued for 30 minutes at 100° C. A mixture of 35.7 grams of the polyurethane oligomer of Example 2, 160.7 grams of styrene and 3.4 grams of AIBN dissolved in 15 ml of methylene chloride was added by a transfer pump at a rate of about 0.8 grams per minute. Total addition time for the reactants was 3 hours, 50 minutes. The mixture was stirred at 100° C. for 1 hour after the addition was completed and then cooled to room temperature overnight. The mixture was reheated to 100° C. with stirring and was placed under vacuum. The pressure gradually decreased to 1 mm Hg where it was held for 3 hours. The homogeneous white liquid product weighed 558 grams (theoretical is 571.4–574.2 grams). The styrene conversion was 90.5–92.2%, and the total polystyrene content was 27.8–28.3% by weight of product. The viscosity was measured on a Brookfield viscometer to be 11,400 cps at 24° C. GPC showed peak molecular weights at 4,600 (51.7%) and 30,000 (48.3%).

[1] This is a polyol having a molecular weight of about 4,000 and prepared by end-capping a propoxylated propylene glycol precursor with ethylene oxide to a final hydroxyl number of about 28.7.

EXAMPLE 6

375 Grams of a polyether polyol[1] were weighed into a one-liter, 3-neck round bottom flask equipped with thermometer, stirrer and nitrogen inlet and outlet, and were heated to 100° C. $N_2$ gas was then passed through the polyol via a subsurface inlet tube at a moderate rate. After purging for 30 minutes at 100° C., a mixture of 35.7 grams of the polyurethane oligomer of Example 2, 256 grams of styrene and 4.0 grams of AIBN dissolved in 19 grams of methylene chloride was added by a transfer pump at a rate of about 0.8 grams per minute. Total addition time for the reactants was 5½ hours. The mixture was heated to 100° C. for ½ hour additional time and was allowed to cool to room temperature overnight. The mixture was reheated to 100° C. and placed under vacuum with stirring. The pressure slowly decreased to 2.5 torr where it was held for 3 hours. The homogeneous white liquid product weighed 658 grams (theoretical is 666.7–670 grams). The styrene conversion was 95.5–96.7%, and the total polystyrene content was 38.7–39.2% by weight of product. The viscosity was measured on a Brookfield viscometer to be 20,400 cps at 23° C. GPC showed peak molecular weights at 4,600 (40.5%) and 36,000 (59.5%).

[1] This is a polyol having a molecular weight of about 4,000 and prepared by end-capping a propoxylated propylene glycol precursor with ethylene oxide to a final hydroxyl number of about 28.7.

EXAMPLE 7

375 Grams of a polyether polyol[1] were weighed into a one-liter, 3-neck round bottom flask equipped with thermometer, stirrer and nitrogen inlet and outlet, and were heated to 100° C. $N_2$ gas was then passed through the polyol via a subsurface inlet tube. After purging for 30 minutes at 100° C., a mixture of 35.7 grams of the polyurethane oligomer of Example 2, 389.3 grams of styrene and 4.8 grams of AIBN dissolved in 28 ml of methylene chloride was added by a transfer pump at a rate of about 1.0 gram per minute. Total addition time for the reactants was 6 hours, 45 minutes. The mixture was stirred at 100° C. for an additional 30 minutes and then allowed to cool to ambient temperature. The mixture was reheated to 100° C. and placed under vacuum with stirring. The pressure slowly decreased to 2.5 torr where it was held for 4 hours. The homogeneous white liquid product weighed 794 grams (theoretical is 800–804 grams). The styrene conversion was 97.5–98.5% and the total polystyrene content was 49.1–49.6% by weight of product. The viscosity was measured on a Brookfield viscometer to be 76,000 cps at 23° C. GPC showed peak molecular weights at 4,600 (32.3%) and 53,000 (67.7%).

[1] This is a polyol having a molecular weight of about 4,000 and prepared by end-capping a propoxylated propylene glycol precursor with ethylene oxide to a final hydroxyl number of about 28.7.

EXAMPLE 8

375 Grams of a polyether polyol[1] were weighed into a one-liter, 3-neck round bottom flask equipped with thermometer, stirrer and nitrogen inlet and outlet, and were heated to 100° C. $N_2$ gas was then passed into the polyol via a subsurface inlet tube. After purging with $N_2$ for 30 minutes, a mixture of 35.7 grams of the polyurethane oligomer of Example 2, 389.3 grams of styrene and 4.8 grams of AIBN dissolved in 28 ml of methylene chloride was added by a transfer pump at a rate of about 1.2 grams per minute. Total time required for addition of the reactants was 6 hours. The mixture was stirred at 100° C. for 1 hour after the addition was complete. The mixture was allowed to cool to ambient temperature overnight. The mixture was reheated to 100° C. and placed under vacuum. The pressure slowly decreased to 10 torr where it was held for 4 hours. The homogeneous white liquid product weighed 782.3 grams (theoretical is 800–804 grams). The styrene conversion was 94.6–95.6%, and the total polystyrene content was 48.4–48.9% of product. The viscosity was measured on a Brookfield viscometer to be 94,000 cps at 23° C. GPC showed peak molecular weights at 47,000 (85.5%) and 4,500 (14.5%).

[1] This is a polyol having a molecular weight of about 4,000 and prepared by end-capping a propoxylated propylene glycol precursor with ethylene oxide to a final hydroxyl number of about 28.7.

EXAMPLE 9

360 Grams of a polyether polyol[1] were weighed into a one-liter, 3-neck round bottom flask equipped with thermometer, stirrer and nitrogen inlet and outlet, and were heated to 100° C. $N_2$ gas was then passed into the polyol via a subsurface inlet tube. After purging with $N_2$ for 30 minutes, a mixture of 57.1 grams of the polyurethane oligomer of Example 2, 382.9 grams of styrene and 4.8 grams of AIBN dissolved in 28 ml of methylene chloride was added by a transfer pump at a rate of about 1.2 grams per minute. Total time required for addition of the reactants was 5½ hours. The mixture was stirred at 100° C. for 1 hour after completion of the addition. The mixture was allowed to cool to ambient temperature overnight. The mixture was reheated to 100° C. and placed under vacuum. The pressure slowly decreased to 10 torr where it was held for 4 hours. The homogeneous white liquid product weighed 786 grams (theoretical is 800–804 grams). The styrene conversion was 95.5–96.5%, and the total polystyrene content was 48.6–49.1% by weight of product. The viscosity was measured on a Brookfield viscometer to be 166,000 cps at 25° C. GPC showed peak molecular weights at 50,000 (86.5%) and 4,500 (13.5%).

[1] This is a polyol having a molecular weight of about 4,000 and prepared by end-capping a propoxylated propylene glycol precursor with ethylene oxide to a final hydroxyl number of about 28.7.

EXAMPLE 10

375 Grams of a polyether polyol[1] were weighed into a one-liter, 3-neck round bottom flask equipped with thermometer, stirrer and nitrogen inlet and outlet, and were heated to 100° C. N$_2$ gas was then passed through the polyol via a subsurface inlet tube at a moderate rate. After purging for 30 minutes at 100° C., a mixture of 35.7 grams of the polyurethane oligomer of Example 2, 143.6 grams of styrene, 17.1 grams of ethylene dimethacrylate and 3.4 grams of AIBN dissolved in 25 ml of methylene chloride was added by a transfer pump at a rate of about 0.8 grams per minute. The addition required 4 hours total (the temperature dropped to 70° C. at one point during the reaction and climbed to 109° C. after heating started again). The mixture was heated at 100° C. for 1 hour after the addition was completed and then allowed to cool to ambient temperature overnight. The mixture was reheated to 100° C. and placed under vacuum. The pressure slowly decreased to 4 torr where it was held for 3 hours. The homogeneous white liquid product weighed 559 grams (theoretical is 571.4–574.2 grams). Total monomer conversion was 91.1–92.8%, and the total polymer content was 27.9–28.4% of product. The viscosity was measured on a Brookfield viscometer to be 64,000 cps at 25° C. GPC showed peak molecular weights at 32,000 (19.7%) and 4,500 (80.3%).

[1]This is a polyol having a molecular weight of about 4,000 and prepared by end-capping a propoxylated propylene glycol precursor with ethylene oxide to a final hydroxyl number of about 28.7.

TABLE I

PHYSICAL DATA ON GRAFT COPOLYMER PREPARATION

| Example | Polyol[1] | Polyurethane Oligomer | Styrene Conversion | Polystyrene Content | Viscosity (cps) | Hydroxyl Number[2] Theoretical | Actual |
|---|---|---|---|---|---|---|---|
| 3 | 77.1% | 5.25% | 81.5–84% | 17.1–17.6% | 8,700 (25°) | 22.1 | — |
| 4 | 78.5% | 5.23% | 75.5–78% | 15.8–16.3% | 5,600 (25°) | 23.6 | 22.5 |
| 5 | 67.2% | 4.48% | 90.5–92.2% | 27.8–28.3% | 11,400 (24°) | 20.4 | 19.3 |
| 6 | 57.0% | 3.80% | 95.5–96.7% | 38.7–39.2% | 20,400 (23°) | 20.5 | 16.4 |
| 7 | 47.2% | 3.15% | 97.5–98.5% | 49.1–49.6% | 76,000 (23°) | 18.9 | 13.5 |
| 8 | 48.0% | 3.20% | 94.6–95.6% | 48.4–48.9% | 94,000 (23°) | 20.0 | 13.7 |
| 9 | 45.8% | 5.09% | 95.5–96.5% | 48.6–49.1% | 166,000 (25°) | 23.6 | 13.1 |
| 10[3] | 67.1% | 4.47% | 91.1–92.8% | 27.9–28.4% | 64,000 (25°) | 20.3 | 19.2 |

[1]This is a polyol having a molecular weight of about 4,000 and prepared by end-capping a propoxylated propylene glycol precursor with ethylene oxide to a final hydroxyl number of about 28.7.
[2]During the determinations, some of the polyols, particularly those from Examples 7, 8, and 9, precipitated during titration. This may account for some of the lower than theoretical hydroxyl number determinations.
[3]10% of the monomer feed was ethylene dimethacrylate (90% was styrene).

EXAMPLES 11–15

In these Examples, graft copolymers were prepared following the procedure according to Example 10, except that different proportions of the reactants were used. The amount of each material used in each of these Examples is set forth in Table II.

TABLE II

PHYSICAL DATA ON GRAFT COPOLYMER PREPARATION

| Example | Polyol[1] (%) | Polyol[2] (%) | Polyol[3] (%) | Polyurethane Oligomer[4] (%) | Styrene (%) | AIBN (%) | Styrene Conversion | Polystyrene Content | Viscosity (cps) | Hydroxyl Number[5] |
|---|---|---|---|---|---|---|---|---|---|---|
| 11 | 65.7 | — | — | 1.97 | 31.8 | 0.57 | 94.6–96.1% | 30.6–31.1% | 3,720 | 19.1 |
| 12 | 66.4 | — | — | 1.00 | 32.1 | 0.58 | 80.8–82.2% | 27.6–28.1% | 3,410 | 20.2 |
| 13 | 66.1 | — | — | 1.32 | 32.0 | 0.57 | 90.1–91.6% | 29.9–30.3% | 3,620 | 20.2 |
| 14 | — | 65.6 | — | 1.97 | 31.8 | 0.57 | 94.4–95.9% | 30.6–31.1% | 11,260 | 23.5 |
| 15 | — | — | 65.6 | 1.97 | 31.8 | 0.57 | 93.4–94.8% | 30.4–30.9% | 7,920 | 36.8 |

[1]This is a polyol having a molecular weight of about 4,000 and prepared by end-capping a propoxylated propylene glycol precursor with ethylene oxide to a final hydroxyl number of about 28.7.
[2]This is a polyol having a molecular weight of about 4,700 and prepared by end-capping a propoxylated glycerin precursor with ethylene oxide to a final hydroxyl number of about 35.2.
[3]This is a polyol having a molecular weight of about 3,000 and prepared by random propoxylation, ethoxylation of glycerin to a final hydroxyl number of about 54.9.
[4]This is the polyurethane oligomer of Example 1.
[5]Theoretical.

Polyurethane Preparation

EXAMPLES 16–20

Elastomeric castings were prepared according to the following standard procedure:

A graft copolymer and 1,4-butanediol (BDO) were weighed together and mixed thoroughly using a wooden applicator. A polyisocyanate[1] was weighed into the mixture and was mixed in thoroughly. A urethane catalyst[2] was then added and was mixed in for 20–30 seconds. The mixture was then degassed at about 1 torr vacuum for 30–60 seconds and immediately poured into a preheated (120° C.) mold formed of glass plates coated with a mold release agent[3] and separated by ⅛" teflon spacers. The mold was placed in an oven at 120° C. for 4 hours and was post-cured at 150° C. for 1 hour.

[1]This is a diphenylmethane diisocyanate prepolymer commercially available from Upjohn Company under the designation "Isonate 143L".
[2]This is an organic mercurial urethane catalyst commercially available from Cosan Chemical Corp. under the designation "Cocure 44".
[3]This is commercially available from Greenchem Products, Inc. under the designation "MR 515".

The compositions used in the various examples are presented in Table III along with the physical properties obtained for the castings.

COMPARATIVE EXAMPLE 1

For purposes of comparison, an elastomeric casting was prepared in the same manner as those made in Examples 16–20; however, the polyol used was a diol having a molecular weight of about 4,000 and prepared by end-capping a propoxylated propylene glycol precursor with ethylene oxide to a final hydroxyl number of about 28.7. The formulation used in making this casting is presented in Table III along with the physical properties obtained for the casting.

In comparing the results, the elastomers prepared from graft copolymers of the invention showed flexural modulus properties substantially better than those demonstrated by the elastomer made from the diol. For a given amount of polyol employed (80 parts), the values were generally more than double those obtained in the Comparative Example.

TABLE III

PHYSICAL PROPERTIES - ELASTOMERS FROM GRAFT COPOLYMERS

| Example | Polyol Used | Polyol (parts) | BDO (parts) | Polyisocyanate (parts) | Tensile Strength (psi) Ultimate | Tensile Strength (psi) 100% MOD | Elongation (%) | Tear Strength (pli) | Heat-sag (in) | Hardness (Shore D) | Flex. Modulus (psi) −20°F. | Flex. Modulus (psi) 73° F. | Flex. Modulus (psi) 158° F. |
|---|---|---|---|---|---|---|---|---|---|---|---|---|---|
| 16 | Example 12 | 80 | 20 | 69.4 | 2920 | 2710 | 260 | 670 | 0.14 | 66.6 | 177,500 | 77,200 | 40,800 |
| 17 | Example 13 | 80 | 20 | 69.6 | 2990 | 2430 | 305 | 680 | — | 66.2 | 167,900 | 73,800 | 38,800 |
| 18 | Example 14 | 80 | 20 | 69.6 | 3090 | 2960 | 170 | 725 | 0.10 | 69.0 | 182,600 | 85,900 | 42,700 |
| 19 | Example 14 | 85 | 15 | 53.7 | 2500 | 2230 | 280 | 530 | 0.31 | 61.6 | 115,800 | 43,300 | 21,700 |
| 20 | Example 14 | 88 | 12 | 44.2 | 2160 | 1860 | 330 | 420 | 0.60 | 54.4 | 61,700 | 21,100 | 12,000 |
| CE-1 | [1] | 80 | 20 | 71.6 | 3240 | 1870 | 380 | 550 | 0.21 | 55.0 | 80,600 | 29,200 | 15,000 |

[1]This is a polyol having a molecular weight of about 4,000 and prepared by end-capping a propoxylated propylene glycol precursor with ethylene oxide to a final hydroxyl number of about 28.7.

EXAMPLES 21-23

Flexible foams were prepared using a standard hand-mix procedure. The formulations used in making these foams are presented in Table IV along with the physical properties obtained for the foams.

COMPARATIVE EXAMPLES 2 and 3

For purposes of comparison, two flexible foams were prepared following the procedure of Examples 21-23. In Comparative Example 2, however, there was employed a graft copolymer commercially available from Union Carbide Corporation under the designation "UCC 31-28". While in Comparative Example 3, the polyol reactant was 100% triol and did not contain any graft copolymer. The formulations used in making these foams are presented in Table IV along with the physical properties obtained for the foams.

In comparing the results, the foam prepared in Example 21 showed overall properties generally at least comparable to those demonstrated by the foam made from the prior art graft copolymer. In particular, this foam exhibited improved ILD values generally indicating desirable comfort characteristics, this property being important in flexible foam applications.

The foams made in Examples 22 and 23 showed ILD values substantially better than those demonstrated by the foam made in Comparative Example 3.

TABLE IV

HAND-MIX FLEXIBLE FOAMS

| | Example 21 | Example 22 | Example 23 | Comparative Example 2 | Comparative Example 3 |
|---|---|---|---|---|---|
| Polyether polyol[1] (phr) | 80 | — | — | 80 | — |
| Polyether polyol[2] (phr) | — | 20 | 50 | — | 100 |
| Graft copolymer (phr) (Example 14) | 20 | — | — | — | — |
| Graft copolymer (phr) (Example 15) | — | 80 | 50 | — | — |
| Graft copolymer[3] (phr) | — | — | — | 20 | — |
| Polyisocyanate[4] (phr) | 29.9 | 47.2 | 48.1 | 30.1 | 49.6 |
| Surfactant[5] (phr) | 1.0 | 1.0 | 1.0 | 1.0 | — |
| Surfactant[6] (phr) | — | 1.0 | 1.0 | 1.0 | — |
| Triethylene diamine[7] (phr) | 0.4 | 0.25 | 0.25 | 0.4 | 0.25 |
| Diethanolamine (phr) | 0.8 | — | — | 0.8 | — |
| Stannous octoate (phr) (50% in dioctyl phthalate) | — | 0.5 | 0.5 | — | 0.5 |
| Dibutyltin dilaurate (phr) | 0.4 | — | — | 0.4 | — |
| Water (phr) | 1.8 | 4.0 | 4.0 | 1.8 | 4.0 |
| Rise (seconds) | — | 110 | 110 | — | 95 |
| Gel (seconds) | 145 | 130 | 130 | 130 | 115 |
| Density (pcf) | 2.92 | 1.66 | 1.67 | 2.87 | 1.77 |
| ILD (lbs) | | | | | |
| 25% Deflection | 43.5 | 68.0 | 58.4 | 40.0 | 31.6 |
| 65% Deflection | 96.7 | 157.0 | 122.0 | 95.5 | 70.8 |
| Tensile strength (psi) | 11.3 | 16.9 | 13.9 | 14.0 | 19.8 |
| Elongation (%) | 130 | 117 | 107 | 147 | 247 |
| Tear strength (pli) | 0.91 | 1.60 | 1.76 | 1.09 | 2.98 |
| Ball Rebound (% rebound) | 48.8 | 28.2 | 35.0 | 38.4 | 37.0 |
| Compression set (%) | | | | | |
| 50% Deflection | 3.23 | 4.49 | 2.89 | 3.09 | 4.89 |
| 90% Deflection | 4.82 | 8.87 | 6.17 | 4.49 | 9.30 |

[1]This is a polyol having a molecular weight of about 4,700 and prepared by end-capping a propoxylated glycerin precursor with ethylene oxide to a final hydroxyl number of about 35.2.
[2]This is a polyol having a molecular weight of about 3,000 and prepared by random propoxylation and ethoxylation of glycerin.
[3]This is a graft copolymer commercially available from Union Carbide Corporation under the designation "UCC 31-28" containing 21% by weight polyacrylonitrile and having a hydroxyl number of 28.
[4]This is a mixture of toluene diisocyanate isomers (80:20 mixture of 2,4/2,6-isomers).
[5]This is commercially available from Union Carbide Corporation under the designation "L-5305".
[6]This is commercially available from Union Carbide Corporation under the designation "L-5720".
[7]This is commercially available from Air Products and Chemicals, Inc. under the designation "Dabco 33LV". It consists primarily of triethylene diamine (⅓) and dipropylene glycol (⅔).

What is claimed is:
1. A process for preparing a graft copolymer comprising:
(a) reacting at least one organic polyisocyanate with at least one polyol having an average equivalent weight from about 100 to about 6000 in an equivalent ratio of NCO to OH from about 1.02/1 to about 2/1 to yield an isocyanate-terminated prepolymer;
(b) reacting said isocyanate-terminated prepolymer with at least one isocyanate reactive group-con- taining unsaturated monomer in sufficient proportions to form a polyurethane oligomer having a final free NCO content from about 0% to about 1% by weight and having terminal reactive unsaturation; and (c) copolymerizing said polyurethane oligomer with at least one ethylenically unsaturated monomer in the presence of at least one polyol and in the presence of a catalytically effective amount of a free radical catalyst at a temperature from about 80° C. to about 170° C. to form a dispersion of a graft copolymer of said oligomer and said monomer in a polyol medium.

2. The process of claim 1 wherein said organic polyisocyanate employed in step (a) is an isomeric mixture of 2,4- and 2,6-toluene diisocyanate.

3. The process of claim 1 wherein said polyol employed in step (a) is a polyether polyol.

4. The process of claim 1 wherein the reaction of step (a) is carried out in the presence of a copolymerizable solvent.

5. The process of claim 4 wherein said copolymerizable solvent is a vinylidene compound.

6. The process of claim 1 wherein said isocyanate reactive group-containing unsaturated monomer is selected from the group consisting of hydroxyethyl acrylate, hydroxypropyl acrylate, hydroxyethyl methacrylate, hydroxyethyl acrylamide, hydroxypropyl acrylamide and mixtures thereof.

7. The process of claim 1 wherein said ethylenically unsaturated monomer is selected from the group consisting of styrene, acrylonitrile, vinyl chloride, methyl methacrylate, hydroxyethyl acrylate, butadiene, isoprene, chloroprene, and mixtures thereof.

8. The process of claim 1 wherein said polyurethane oligomer is employed in step (c) in an amount from about 0.2% to about 15%, based on the weight of total polyol present.

9. The process of claim 1 wherein said ethylenically unsaturated monomer is employed in step (c) in an amount from about 5% to about 60%, based on the weight of total polyol present.

10. A process for preparing a graft copolymer comprising:

(a) reacting an isomeric mixture of 2,4- and 2,6-toluene diisocyanate with a polyether polyol having an average equivalent weight from about 1000 to about 3000 in an equivalent ratio of NCO to OH from about 1.1/1 to about 1.4/1 to yield an isocyanate-terminated prepolymer;

(b) reacting said isocyanate-terminated prepolymer with hydroxyethyl acrylate in sufficient proportions to form a polyurethane oligomer having a final free NCO content from about 0% to about 0.5% by weight and having terminal reactive unsaturation; and (c) copolymerizing said polyurethane oligomer with styrene in the presence of a polyol and in the presence of a catalytically effective amount of a free radical catalyst at a temperature from about 90° C. to about 140° C. to form a dispersion of a graft polymer of said oligomer and said styrene in a polyol medium.

11. The process of claim 10 wherein the reaction of step (a) is carried out in the presence of a copolymerizable solvent comprising styrene.

12. The process of claim 11 wherein said polyurethane oligomer is employed in step (c) in an amount from about 0.5% to about 5%, based on the weight of total polyol present.

13. The process of claim 12 wherein said styrene is employed in step (c) in an amount from about 15% to about 40%, based on the weight of polyol present.

14. The process of claim 13 wherein said polyol used in step (c) is the same as said polyether polyol employed in step (a).

15. A dispersion of a graft copolymer in a polyol medium as produced by the process of claim 1.

16. A graft copolymer as produced by the process of claim 1.

17. A dispersion of a graft copolymer in a polyol medium as produced by the process of claim 10.

18. A graft copolymer as produced by the process of claim 10.

19. In a process for preparing a polyurethane composition from a reaction mixture comprising a polyol reactant, an organic polyisocyanate, and a polyurethane-forming catalyst, the improvement wherein said polyol reactant comprises a dispersion of a graft copolymer in a polyol medium prepared according to the process of claim 1.

20. A polyurethane composition prepared according to the process of claim 19.

21. In a process for preparing a polyurethane composition from a reaction mixture comprising a polyol reactant, an organic polyisocyanate, and a polyurethane-forming catalyst, the improvement wherein said polyol reactant comprises a dispersion of a graft copolymer in a polyol medium prepared according to the process of claim 10.

22. A polyurethane composition prepared according to the process of claim 21.

23. In a process for preparing a polyurethane foam from a reaction mixture comprising a polyol reactant, an organic polyisocyanate, a polyurethane-forming catalyst, and a foaming agent, the improvement wherein said polyol reactant comprises a dispersion of a graft copolymer in a polyol medium prepared according to the process of claim 1.

24. A polyurethane foam prepared according to the process of claim 23.

25. In a process for preparing a polyurethane foam from a reaction mixture comprising a polyol reactant, an organic polyisocyanate, a polyurethane-forming catalyst, and a foaming agent, the improvement wherein said polyol reactant comprises a dispersion of a graft copolymer in a polyol medium prepared according to the process of claim 10.

26. A polyurethane foam prepared according to the process of claim 25.

* * * * *